Figure 1:
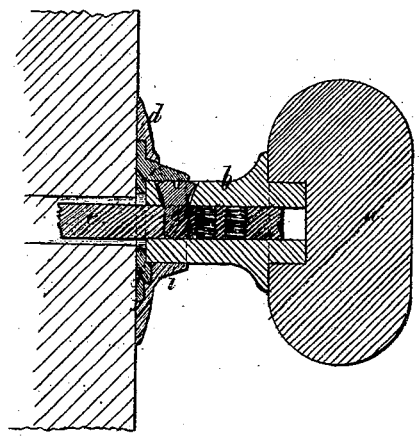

*W. T. Munger,*

*Knob Rose.*

No. 100,314. Patented Mar. 1, 1870.

Witnesses
Chas. H. Smith
Harold Serrell

W. T. Munger
per L. W. Serrell
atty

United States Patent Office.

W. T. MUNGER, OF NEW BRITAIN, CONNECTICUT, ASSIGNOR TO P. & F. CORBIN, OF SAME PLACE.

Letters Patent No. 100,314, dated March 1, 1870.

IMPROVEMENT IN ROSE FOR DOOR-KNOBS.

The Schedule referred to in these Letters Patent and making part of the same.

*To all whom it may concern:*

Be it known that I, W. T. MUNGER, of New Britain, in the county of Hartford, and State of Connecticut, have invented an Improvement in Roses for Door-Knobs, and the following is declared to be a correct description thereof.

This invention is devised for securing the screw that holds the knob to the spindle, and for preventing said screw dropping out or coming into contact with the fingers in grasping the knob.

My invention consists in a two-part sectional rose or escutcheon for the spindle and knob-shank, the main portion of the rose having a flange or cylinder partially surrounding the shank of the knob, and the remainder of the said cylinder being upon a disk, through which the spindle passes, so that when the parts are together the cylindrical flange surrounds the shank and covers the screw that passes through the same, preventing it from falling out or coming in contact with the fingers, should it become loose from the frequent handling of the knob.

In the drawing—

*a* is the knob;

*b*, the shank; and

*c*, the spindle, united to the shank by the screw *e*.

These parts are shown sectionally in Figure 1, and may be of any usual or desired character.

Figure 2:
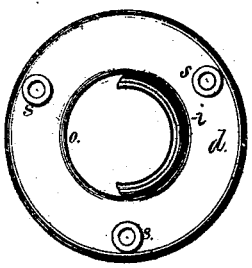
Figure 3:
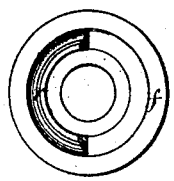

The main portion, *d*, of the rose is shown detached in Figure 2, and the disk and secondary portion, *f*, of the rose is shown in Figure 3.

The cylindrical portion of the rose, into which the shank *b* passes, and which covers up or secures the screw *e*, is made of two parts, the portion *i* being formed as a flange upon the rose *d*, and the other portion, *r*, being formed upon the disk *f*, and when the parts are together the portion *r* passes into the part *o* of the opening in the rose *d*, completing the cylinder that surrounds the shank *b*.

In putting the knob on the spindle, first slip the part *d* of the rose upon the shank *b*, and pass the disk *f* upon the spindle *c*; put the knob upon the spindle, enter the screw *e* firmly, to secure the handle and spindle; then slip the rose *d* back against the door and secure it by screws through the holes *s s s*, or otherwise.

By this construction the disk *f* prevents end motion to the spindle and knob, and the cylindrical flange formed by the sections *i* and *r* supports the shank against lateral movement, and keeps the screw *e* in place.

I claim as my invention—

The rose, formed of the parts *d* and *f*, upon which are the sections *i* and *r* of the cylindrical flange that surrounds the end of the shank, and retains the screw *e*, should it become loose, as specified.

Signed this 23d day of December, 1869.

W. T. MUNGER.

Witnesses:
CHARLES PECK,
R. S. PORTER.